(12) United States Patent
Barkett et al.

(10) Patent No.: US 9,396,500 B2
(45) Date of Patent: Jul. 19, 2016

(54) METHODS AND SYSTEMS FOR ADAPTIVE CAPACITY MANAGEMENT

(75) Inventors: Andrew Barkett, Redwood City, CA (US); Hongzhong Jia, Cupertino, CA (US); Xiaojun Liang, San Jose, CA (US); John Morrow, Mountain View, CA (US); Daniil Neiter, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 651 days.

(21) Appl. No.: 13/528,300

(22) Filed: Jun. 20, 2012

(65) Prior Publication Data

US 2013/0346587 A1   Dec. 26, 2013

(51) Int. Cl.
*G06F 15/173* (2006.01)
*G06Q 50/00* (2012.01)
*G06Q 10/10* (2012.01)
*H04L 29/08* (2006.01)

(52) U.S. Cl.
CPC ............... *G06Q 50/01* (2013.01); *G06Q 10/10* (2013.01); *H04L 67/1002* (2013.01)

(58) Field of Classification Search
CPC .................................. G06F 9/50; G06F 9/5094
See application file for complete search history.

(56) References Cited

U.S. PATENT DOCUMENTS

| 5,341,477 | A  | * | 8/1994  | Pitkin et al. ................. 709/226 |
| 7,321,926 | B1 | * | 1/2008  | Zhang et al. ................. 709/220 |
| 2008/0114866 | A1 | * | 5/2008  | Round .......................... 709/223 |
| 2009/0106571 | A1 | * | 4/2009  | Low et al. ..................... 713/310 |
| 2010/0037225 | A1 | * | 2/2010  | Doyle et al. .................. 718/102 |
| 2010/0050171 | A1 | * | 2/2010  | Liang et al. ..................... 718/1 |
| 2010/0257532 | A1 | * | 10/2010 | Liang et al. .................. 718/103 |
| 2010/0306781 | A1 | * | 12/2010 | Loboz et al. .................. 718/105 |
| 2012/0102498 | A1 | * | 4/2012  | Subramanya et al. ........ 718/104 |
| 2013/0268560 | A1 | * | 10/2013 | Pallares Lopez et al. ..... 707/770 |

* cited by examiner

*Primary Examiner* — Jeffrey R Swearingen
(74) *Attorney, Agent, or Firm* — Perkins Coie LLP

(57) ABSTRACT

Techniques to adaptively manage service requests within a multi-server system. In one embodiment, a service request and a service rule associated with the service request are received. Data about operating parameters of at least one server in a multi-server system are also received as part of a feedback loop. A response to the service request based on the service rule and the operating parameters is determined. Execution of the service request may be modified according to a tiered service rule based on the at least one server reaching a capacity threshold. The modification includes omitting an action in execution of the service request.

16 Claims, 9 Drawing Sheets

METHODS AND SYSTEMS FOR ADAPTIVE CAPACITY MANAGEMENT

FIELD OF THE INVENTION

The present application relates to server systems and, in particular, management of shared services across multiple servers in a computer system.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

A member of a social network may highlight or share personal information, news stories, relationship activities, music, and any other content of interest to areas of the website dedicated to the member. Other members of the social network may access the shared content by browsing member profiles or performing dedicated searches. Upon access to and consideration of the content, the other members may react by taking one or more responsive actions, such as providing an opinion about the content, or other feedback. The ability of members to interact in this manner fosters communications among them and helps to realize the goals of social networking websites.

A social network on the internet may require multiple servers to implement the services it provides. If the social network is large, then it may require many servers to provide the necessary computing power to run the social network. Even so, certain servers within the network may become taxed or overburdened with service requests, which can cause delays. For example, if a user attempts to load a web page from the social network, but the server that serves the web page is overburdened, then the user may experience a delay in viewing and interacting with the social network. As another example, overtaxed servers can cause delays or otherwise impact the provision of content or advertising to users of the social network. These types of impacts can reduce the overall quality of service provided by the social network.

SUMMARY

To execute service requests in a multi-server system, embodiments of the invention include systems, methods, and computer readable media to allow adaptive capacity management. A service request and a service rule associated with the service request are received. Data about operating parameters of at least one server in a multi-server system are also received as part of a feedback loop. A response to the service request based on the service rule and the operating parameters is determined.

In an embodiment, the operating parameters of the at least one server are monitored. The monitoring may be performed continuously for a time period. The operating parameters include at least one of: a number of received service requests; an average CPU usage; an average network usage; an average wait time for service requests; a type of service request received; a time between receipt and completion of a service request; and a number of database reads or writes.

In an embodiment, a response to the service request may vary. The service request may be routed to a selected server with sufficient capacity to execute the service request. A priority of the service request may be reduced. The service request may be dropped. The service request may be routed to a geographic region having capacity to execute the service request. A selected server may be powered on when at least a portion of the multi-server system is operating above a capacity threshold. A selected server may be powered off when at least a portion of the multi-server system is operating below a capacity threshold. The service request may be routed to a selected server not in a list of servers without capacity to handle the service request.

In an embodiment, the service rule is tiered based on satisfaction of capacity thresholds. Execution of the service request may be modified according to a tiered service rule based on the at least one server reaching a capacity threshold. The modification may include omitting an action in execution of the service request.

Many other features and embodiments of the invention will be apparent from the accompanying drawings and from the following detailed description.

Figure 1:
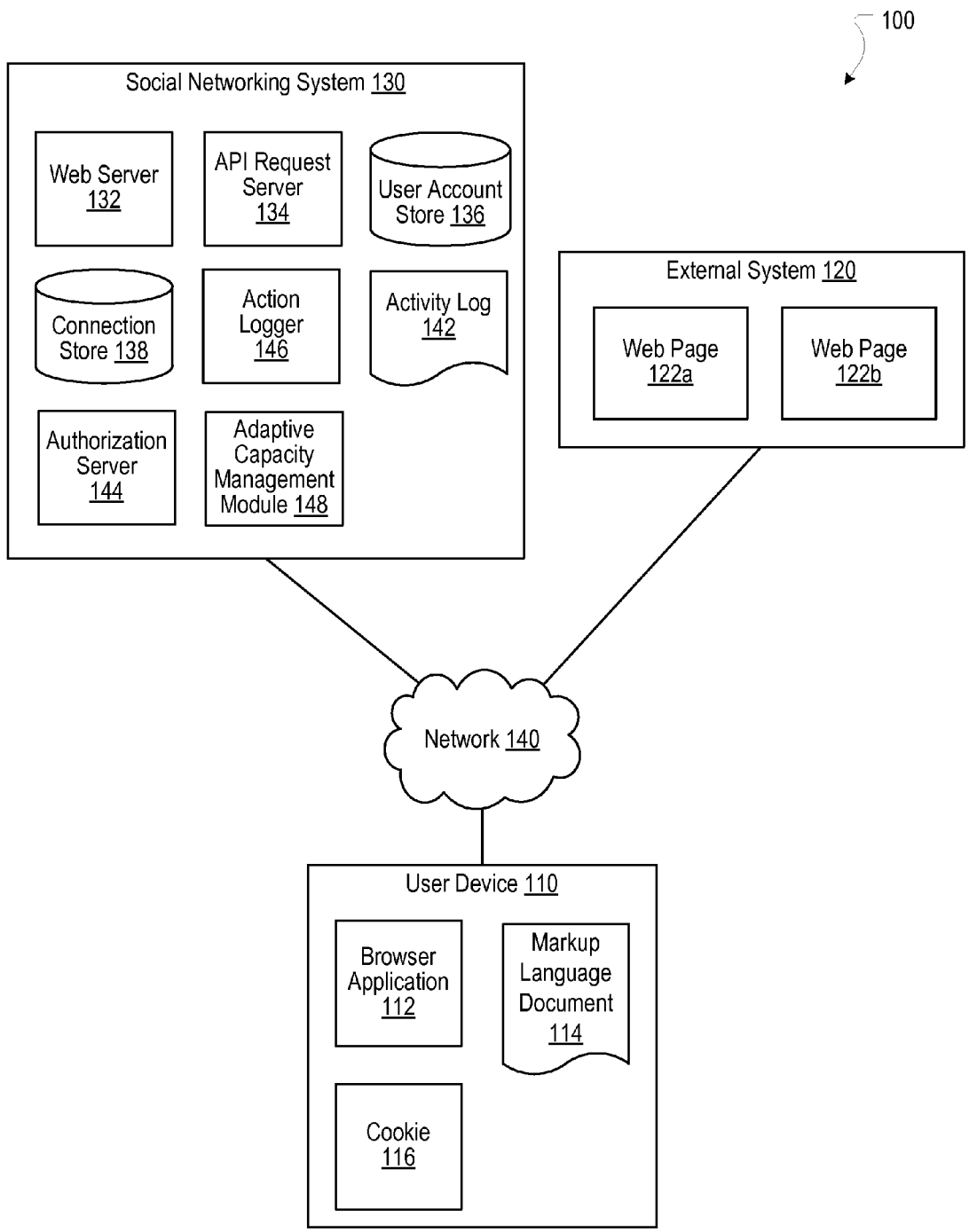
FIG. 1 is a network diagram of a system for adaptive capacity management within a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System Architecture

FIG. 1 is a network diagram of a system 100 for providing adaptive capacity management in a social networking system 130 in accordance with an embodiment of the invention. The system 100 includes one or more user devices 110, one or more external systems 120, the social networking system 130, and a network 140. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 140. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 140. The user device 110 can execute an application, for example, a browser application that allows a user of the user device 110 to interact with the social networking system 130. The user device 110 is configured to communicate with the external system 120 and the social networking system 130 via the network 140, which may comprise any combination of local area and/or wide area networks, using wired and/or wireless communication systems.

In one embodiment, the network 140 uses standard communications technologies and protocols. Thus, the network 140 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 140 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers that include one or more web pages 122a, 122b, which are communicated to the user device 110 using the network 140. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 140.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user account store 136, a connection store 138, an action logger 146, an activity log 142, an authorization server 144, and an adaptive capacity management module 148. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 140. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 140, and the API request server 134 receives the API request. The API request server 134 processes the request by calling an API associated with the API request to generate an appropriate response, which the API request server 134 communicates to the external system 120 via the network 140. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 146 is capable of receiving communications from the web server 132 about user actions on and/or off the social networking system 130. The action logger 146 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 146 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122*a* within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The adaptive capacity management module 148 contains logic to manage service requests based on the capacity of the social networking system 130, as described in more detail below. The adaptive capacity management module 148 may implement a feedback loop to dynamically control the provision of service requests to resources, such as servers within a multi-server system, within the social networking system 130. The feedback loop may account for service requirements associated with a service request and operating parameters of servers that may execute the service request.

Adaptive Capacity Management

Figure 2:
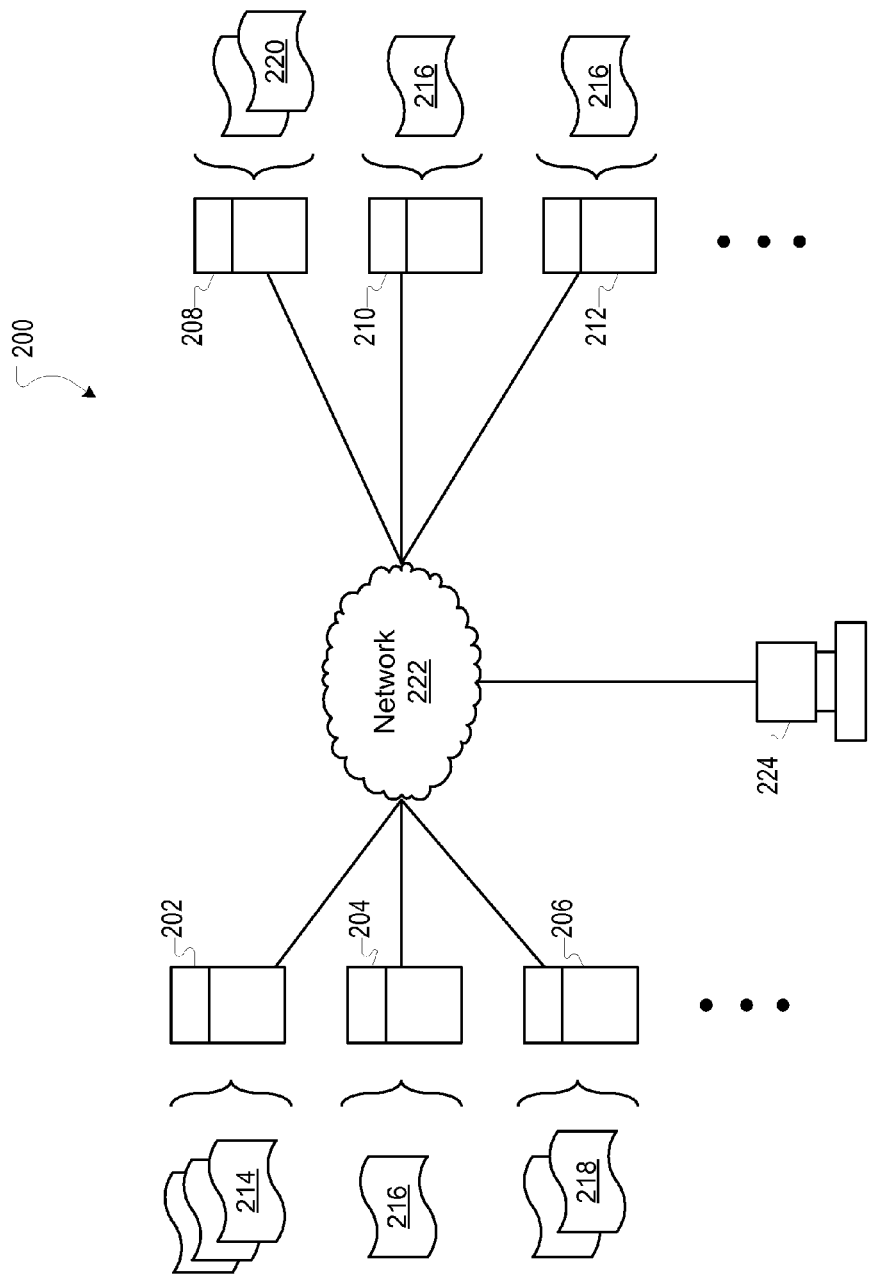
FIG. 2 is a block diagram of a multi-server system in accordance with an embodiment of the invention.

FIG. 2 is a diagram of a network infrastructure for communication across a multi-server system 200. In an embodiment, the multi-server system 200 may be a social network such as the social networking system 130 shown in FIG. 1. For example, the features and services provided by the social networking system 130 may be implemented by multiple servers, such as servers 202, 204, 206, 208, 210, and 212. Although FIG. 2 shows six servers, multi-server system 200 can include fewer servers or more servers as desired. In an embodiment, multi-server system 200 can include thousands of servers working together to implement the social networking system 130.

Each server may execute one or more services. Services may include software programs, applications, daemons, scripts, or other executable code modules that can provide features and functions of the social networking system 130. For example, services executed by servers 202-212 can include authorization services, user account creation services, search services, spam removal services, file server services, database services, web hosting services, image processing services, messaging services, advertising services, graph-related services, etc. In general, a service can be any computer-implemented feature or function provided by the social networking system 130.

As shown in FIG. 2, servers can execute a single service or multiple services. For example, the server 202 is shown executing three services 214, while the server 204 is shown executing a single service 216.

In some instances, a single service may be executed by multiple servers. For example, the servers 204, 210, and 212 are each shown executing service 216. In one embodiment, each server 204, 210, and 212 may be executing a separate instance of service 216. Alternatively, the service 216 may be a service that spans the multiple servers 204, 210, and 212, where each server executes a portion of the service 216.

Servers within the multi-server system 200 may be organized into groups or clusters. For example, the servers may be grouped by the building in which the servers reside, by a geographic region where the servers reside (such as east coast, mid-west, west coast, etc.), by a service the server provides, by the type of server, or by any desired grouping. As an example, the servers 202, 204, and 206 may be geographically organized into a west coast group if they are located on the west coast of a geographic region, and the servers 208, 210, and 212 may be geographically organized into an east coast group if they are located on the east coast of a geographic region.

In an embodiment, servers may also be organized into mirrored regions. For example, the servers 202, 204, and 206 may implement all the services and contain all the data for running the social networking system 130. These servers may, for example, comprise a west coast region that services the west coast of the U.S. The servers 208, 210, and 212 may also contain a mirrored copy of all the services and data required for running the social networking system 130. These servers may, for example, comprise an east coast region of the social networking system 130 that services the east coast of the U.S. or other region. The mirroring of services and data can provide redundancy throughout the social networking system 130. For example, if one or more servers in the west coast region become overloaded or inoperative, servers in the east coast region can temporarily be used to provide services to west coast users, and vice versa. Although east and west coast regions are used as an example, the social networking system 130 can include any number of mirrored regions organized as desired.

The services 214, 216, 218, and 220 may communicate with each other through a network 222. The network 222 may be any type of network that allows communications between the servers 202-212 such as a LAN, a WAN, a wireless network, a wired network, a cellular or satellite network, an internet, etc. In an embodiment, the network 222 may be implemented as or functionally similar to the network 140.

To communicate, the services 214-220 may send messages to each other. In an embodiment, the messages may include requests. For example, suppose that the service 214 is a database service, and the service 216 is a search service. The service 216 may send a request through the network 222 to the database service 214 asking for database records that match a particular search query.

A user computer 224 may also be connected to the network 222 so that it can communicate with the servers 202-212. For example, the user computer 224 may be a computer from which a user can view and interact with the social networking system 130. As such, the user computer 224 may be the user device 110 and thus may include a web browser or other program that can access services and features provided by the social networking system 130.

Figure 3:
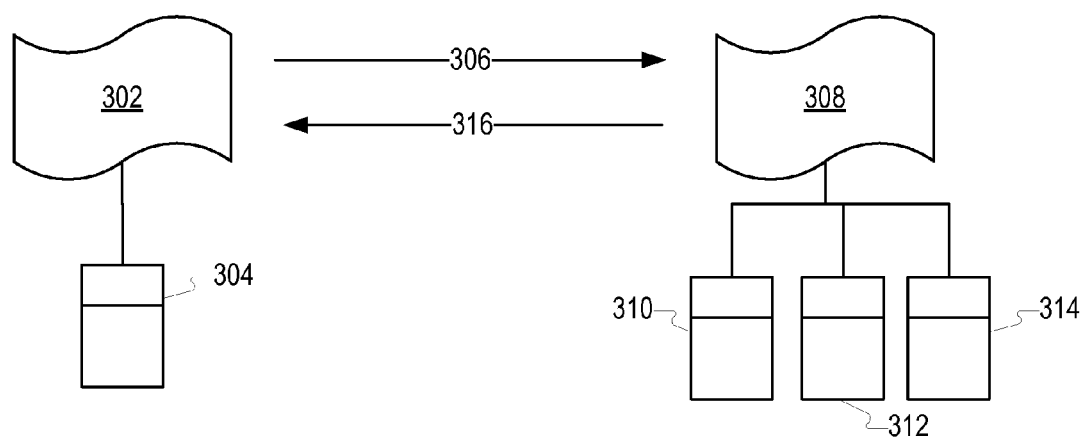
FIG. 3 is a block diagram illustrating inter-service communication in accordance with an embodiment of the invention.

FIG. 3 shows an example of inter-service communication within the multi-server system 200. A service 302 executed by a server 304 may be, for example, a service within the social networking system 130 that allows users to post content on a web page of the social networking system 130. Whenever a user attempts to post content to the website, the service 302 may send a service request, as shown by arrow 306, to a spam-checking service 308. The spam-checking service 308 may check the content to determine whether the content is, for example, an unwanted advertisement or other type of spam. The spam-checking service 308 may be executed by multiple servers, such as servers 310, 312, and 314, within the multi-server system 200.

When the spam-checking service 308 receives the service request, it may process the service request by checking whether the posted content constitutes spam. Processing the request will consume processing power, i.e., processing capacity, and otherwise impact various operating parameters of one or more of the servers 310, 312, and 314. Once the service request has been processed, the spam-checking service 308 may send a reply, as shown by arrow 316, to the service 302 about whether the content proposed for posting has been determined to be spam. The spam-checking service 308 could also take other actions after processing the service request, such as allowing the content to be posted if it is not spam, blocking the content from being posted if it is spam, adding the content to a watch list, providing a CAPTCHA challenge for the user, etc. In an embodiment, the spam-checking service 308 could send a further request to other services within or outside the social networking system 130.

Although FIG. 3 shows a single service 302, making a single service request to the spam-checking service 308, it should be understood that the spam-checking service 308 may receive multiple service requests. If the spam-checking service 308 receives a high number or frequency of requests, the servers 310, 312, and 314 may become overloaded, which can lead to delays or errors in processing the requests.

Figure 4:
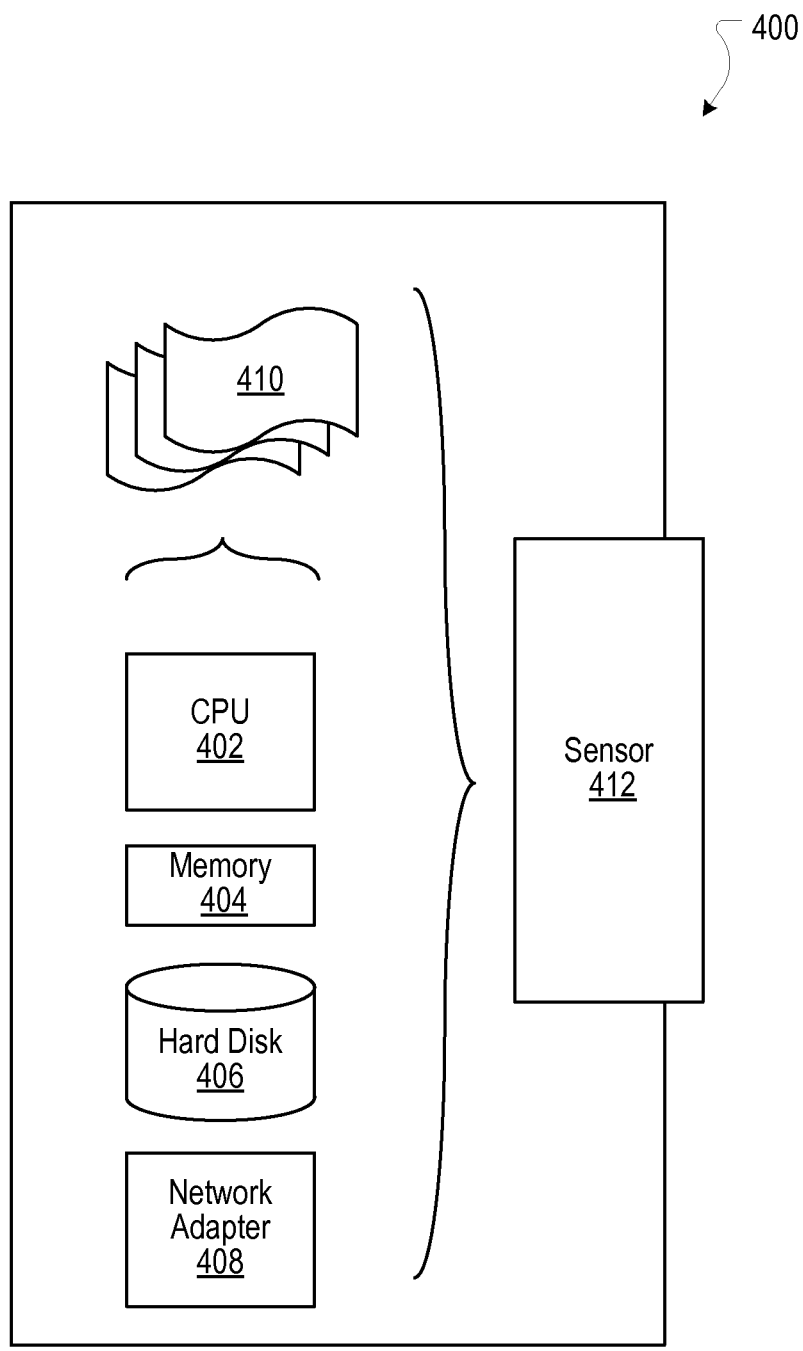
FIG. 4 is a block diagram of a server in accordance with an embodiment of the invention.

FIG. 4 shows a server 400 that may be included within the multi-server system 200. The server 400 may include a CPU 402, a volatile memory 404, a non-volatile storage medium (e.g., hard disk 406), and a network adapter 408. Although not shown, the server 400 may include other components found in servers such as a graphics chip, a north bridge, a south bridge, a monitor, a video output, a mouse and keyboard, multiple CPUs, a RAID array, etc. In an embodiment, the server 400 may be implemented as a computer system shown in FIG. 9. When the server 400 is active within the multi-server system 200, the server 400 may execute one or more services 410. Executing these services 410 may typically consume at least some of the resources provided by the server 400. For example, execution of the services 410 may require CPU execution cycles provided by the CPU 402, memory space provided by the memory 404, hard disk space provided by the hard disk 406, and/or network communications provided by the network adapter 408. Execution of the services 410 may require other resources as well, such as graphics rendering, database access, etc.

Different services may have different impacts on the operating parameters of the servers that execute them. For example, a service that requires much computational resources may create a large computational load on the server 400. Conversely, a service that does not require many resources may not load the server 400 to any great degree. Also, if the server 400 is executing the multiple services 410, then the load on the server 400 may be additive. For example, if a service of the services 410 requires 50% of the CPU time, and another service requires 25% of the CPU time, then the server 410 may be required to provide 75% of its CPU time in order to execute both services. The execution of services can significantly impact the capacity of the server 400 to perform other services.

The server 400 may also include a sensor 412 to monitor operating parameters of the server 400 that describe the load on the server 400. In an embodiment, the sensor 412 may itself be a service or software module executed by the server 400. In another embodiment, the sensor 412 may be a service or software module executed by another computing device or a device separate from the server 400.

The sensor 412 may continuously monitor the load on the server 400 so that it can provide a report of the current load. The sensor 412 can monitor operating parameters, such as the CPU usage, memory usage, hard disk usage, and network usage of the server 400. In an embodiment, the sensor 412 can monitor a load on a component of the server 400. Such loads can include, but are not limited to, memory cache loading, number of running threads, CPU time, idle time, input-output transactions, interrupt time, database or indexing time, paging, etc.

The sensor 412 may also monitor the services 410 executed by the server 400. For example, the sensor 412 may monitor the number and type of the services 410 that are currently executed by the server 400, the load each service 410 places on the server 400, the number of threads created by each of the services 410, the average number of service requests received per second, the average CPU usage, the average network usage, the average CPU wait time, the type of service requests received, the number of reads or writes to backend services such as databases or searches, the time spent waiting for reads or write to backend services to complete, the number of results returned by queries to backend services, the time between receiving a request and completing a request (i.e., request latency), the priority or ranking of received requests, etc.

As the sensor 412 monitors server 400, the sensor 412 may provide a report of the current load of the server 400. The sensor 412 can provide the report in response to a request from another service, or the sensor 412 can periodically send the report with or without receiving a request. The sensor 412 may continuously monitor or periodically poll the server 400 to determine the current load so that, when requested, the sensor 412 can provide a report of the current load on the server 400. The frequency with which the sensor 412 monitors or polls the server 400 can be any desired frequency, so long as the sensor 412 can provide an up-to-date report of the load on the server 400. For example, the polling or reporting frequency can be shorter than a second, one second, five seconds, 10 seconds, 30 seconds, one minute, etc.

Figure 5:
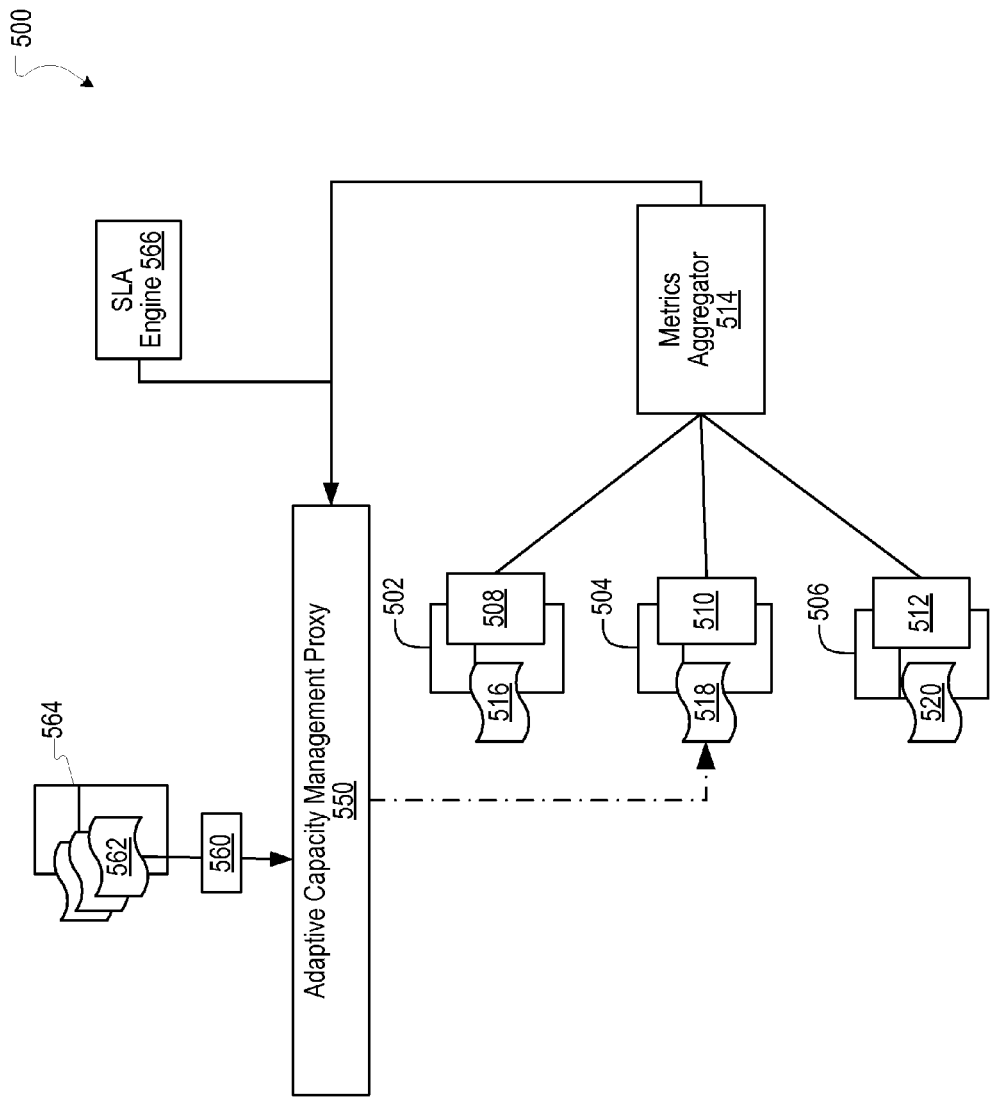
FIG. 5 is a block diagram of a system including an adaptive capacity manager proxy in accordance with an embodiment of the invention.

FIG. 5 shows a system 500 for adaptive capacity management of servers within a multi-server system. In the system 500, multiple servers within the multi-server system can each include a sensor so that the load of each server can be monitored. For example, as shown, a server 502, 504, 506 includes a sensor 508, 510, 512, respectively, and executes a service 516, 518, 520, respectively. The servers 502, 504, 506 may be included in the multi-server system 200. The sensors 508, 510, 512 can monitor and report upon the current load on the servers 502, 504, 506 as the servers 502, 504, 506 execute the services 516, 518, 520. In an embodiment, every server in the multi-server system 200 can execute a sensor service. In another embodiment, only a subset of the servers in the multi-server system may be executing a sensor service. Which servers execute a sensor service may be based upon which servers should be monitored for adaptive capacity management, which will be described in more detail below.

The system 500 may include a metrics aggregator 514 that can collect the information from the sensors 508, 510, 512 running on separate machines. In one embodiment, the metrics aggregator 514 may itself be a service running on one or more servers within the multi-server system 200.

As the sensors 508, 510, 512 monitor the load on the servers 502, 504, and 506, the sensors may send collected information about the operating parameters of the servers to the metrics aggregator 514. The metrics aggregator 514 may collect such information into a central location. In this way, the metrics aggregator 514 can maintain up-to-date information about the load on each server within the multi-server system 200. The metrics aggregator 514 can then determine which servers are under-utilized, utilized to capacity, or over-utilized. The metrics aggregator 514 can also collect information about the services that are running on the servers within the multi-server system 200. For example, the metrics aggregator 514 may collect information that shows that a search service is running on three servers across the multi-server system 200, and that two of those servers are currently over-utilized. This information can be used to determine which server will handle additional requests for searches or other service requests.

In an embodiment, the metrics aggregator 514 can monitor information about groups or regions of servers. For example, upon receiving the reports about operating parameters of servers, the metrics aggregator 514 may determine that the overall east coast region is overloaded and causing delays, but that the west coast region is operating under its capacity. In this case, the west coast region may be able to handle at least some of the east coast's service requests in order to balance the load.

The system 500 may include a service level agreement (SLA) engine 566. In an embodiment, the SLA engine 566 may be a module or service executed by a server. In another embodiment, the SLA engine 566 may be a set of data stored within a database or other storage medium. The SLA engine 566 may provide a set of service rules or preferences for how service requests should be processed.

For example, the SLA engine 566 may require that execution of a service request not exceed a maximum time. A service request subject to such a latency constraint could include, for example, a search initiated by a user or a service that checks whether a proposed or recent user post on the social networking system 130 is spam. To minimize delay in executing a service request (or service requests) 560, the SLA engine 566 may require that the service request 560 be processed by servers that are geographically local to or in the same region as the computer system that originated the service request 560.

As yet another example, the SLA engine 566 may provide tiered service rules for execution of a service request based on operating parameters of the servers and satisfaction of capacity thresholds. For purposes of explanation, assume that a first user of the social networking system 130 interacts with content posted by a second user of the social networking system 130. To determine whether to notify the second user about this interaction, the social networking system 130 may initiate a service request to determine the nature of the connection between the two users. A service executing the service request typically might attempt to return the name of the first user and the relationship of the first user from the perspective of the second user. However, if the capacity of the server (or servers) for executing the service satisfies a capacity threshold (e.g., the capacity of the server has reached 80% or some other level), the SLA engine 566 may provide that the service should prioritize the return of the relationship information over the name of the first user or drop an attempt to determine the name of the first user. In this example, the SLA engine 566 may reflect a determination that, for the service request, relationship information is critical while the name of the first user is dispensable.

As another illustration, assume that a user of the social networking system 130 has performed a search. The search may initiate a service request within the social networking system 130 to return information in response to the search. A service executing the service request typically might identify organic search results, as well as targeted advertising for the user based on her demographics, interests, or other considerations. If the capacity of server resources for executing the service reaches a threshold level, the SLA engine 566 may provide a tiered response based on the operating parameters of the server resources. For example, the SLA engine 566 may provide that organic search results and targeted advertising be identified and returned when the operating parameters indicate that the server resources have ample capacity to execute the service. The SLA engine 566 may provide that organic search results and only general advertising be identified and returned in order to economize on server resources when the operating parameters indicate that the server resources have reached a first capacity threshold (e.g., 75% or other level of capacity). The SLA engine 566 likewise may provide that organic search results and no advertising be returned in response to a search to further economize on server resources when the operating parameters of the server resources have reached a second capacity threshold (e.g., 90% or other level of capacity). In general, the SLA engine 566 may include service rules and preferences that attempt to execute services within predetermined time constraints, reduce the latency of processing service requests, and prioritize important service requests.

To determine which servers should handle incoming service requests, the system 500 may include an adaptive capacity management proxy 550. The adaptive capacity manager proxy (i.e., the "proxy") 550 may receive a service request 560 from a service 562. The service request 560 may be an inter-service communication requesting action from a service executing within multi-server system 200. For example, the service request 560 may be a request to search a social network graph for a particular user. In another example, the service request 560 may be a request for an anti-spam service to determine whether a proposed or recent post to a social networking website is spam. In yet another example, the service request 560 may be a request from a user machine for a web hosting service to provide a web page. It should be understood that many other types of service requests are also possible.

Based on operating parameters of the multi-server system 200 provided by the metrics aggregator 514 and the service rules and preferences of the SLA engine 566, the proxy 550 may route the service request 560 or modify execution of the service so that the service request or other service requests, can be handled in a timely manner. If, for example, the server 504 has the capacity to handle the service request 560, then the proxy 550 may forward the service request 560 to the server 504.

In another example, if operating parameters of server resources indicate that they have reached a capacity threshold, the proxy 550 may modify execution of the service according to the SLA engine 566 so that execution of the service may occur in a timely manner within required time constraints and optimize use of server resources. For example, a service request 560 may be a search request asking a search service to search through a user's entire history within the social networking system 130 to determine the user's likes and dislikes so that an advertisement can be tailored for that particular user. If the servers that service such requests are loaded at or near capacity, as determined by the metrics aggregator 514, the proxy 550 may modify execution of the request based on service rules of the SLA engine 566 so that it requires less processing power. For example, in accordance with the SLA engine 566, the proxy 550 may modify execution of the request so that, instead of searching the user's entire history, only the past few days of history are searched. In another embodiment, execution of the request may be modified so that only the most important or most frequent activity of the user is searched. In yet another embodiment, execution of the request may be modified so that no search is performed at all, and a generic advertisement, rather than a tailored advertisement, can be displayed to the user. By modifying execution of the request so that it requires less processing power, the proxy 550 can ensure that, based on service rules of the SLA engine 566, the request will be serviced in a timely manner so as to enhance the user's experience with the social networking system 130.

If the service request 560 can be broken up into multiple sub-requests, the proxy 550 may create, based on service rules of the SLA engine 566, the multiple sub-requests and forward them to multiple servers, so that each server can process a portion of the service request 560. This may reduce the amount of processing capacity required by any one server. The multiple sub-requests can be sent to multiple servers simultaneously, to multiple servers serially, or to a single server serially in order to ensure the servers have enough processing capacity to execute the service request 560.

Based on service rules of the SLA engine 566, the proxy 550 may respond to the service request 560 in other ways. For example, if the service request 560 includes priority information, the proxy 550 may reduce the priority of the service request 560 so that the servers process other service requests prior to the service request 560. If the number or frequency of incoming service requests 560 is great, the proxy 550 may send messages to the requestors to reduce the amount of the service requests 560 being sent. In yet another example, the proxy 550 may determine that the service request 560 should not be processed and may drop the service request 560 instead of forwarding or modifying it, and may send an error message to the requestor. In an embodiment, the proxy 550, the SLA engine 566, and the metrics aggregator may be included in the adaptive capacity management module 148.

Figure 6:
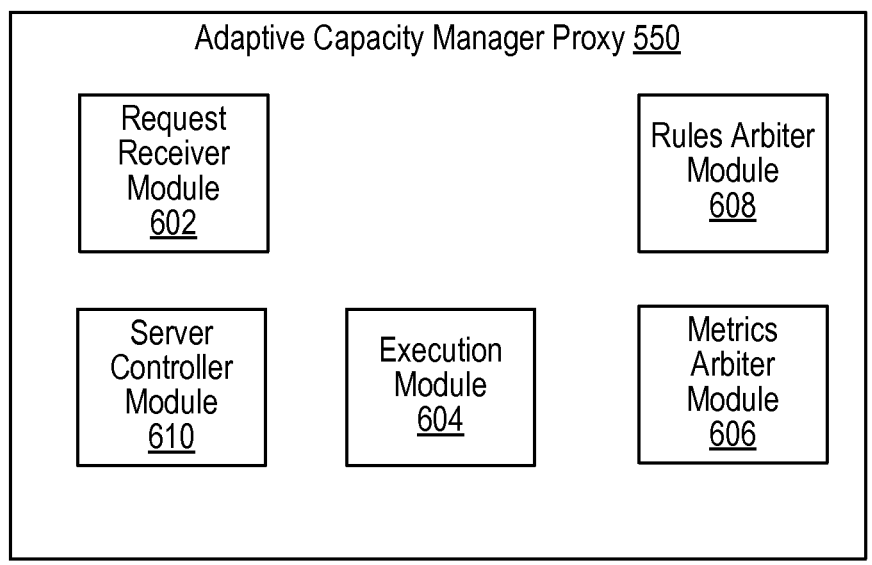
FIG. 6 is a block diagram of an adaptive capacity manager proxy in accordance with an embodiment of the invention.

FIG. 6 shows a block diagram of the proxy 550. As shown, the proxy 550 may include a request receiver module 602, an execution module 604, a metrics arbiter module 606, a rules arbiter module 608, and a server controller module 610. The request receiver module 602 may receive service requests, such as the service request 560, so that the proxy 550 can process the requests. In an embodiment, the request receiver module 602 may intercept service requests that are addressed to services within the social networking system 130. In another embodiment, some or all service requests within the social networking system 130 may be addressed to the proxy 550 so that proxy 550 can act as a central processor and router for the service requests 560.

The rules arbiter module 608 may be in communication with the SLA engine 566 so that once a service request 560 is received the proxy 550 it can determine the rules and preferences associated with the service request 560. Similarly, the metrics arbiter module 606 may be in communication with the metrics aggregator 514 to determine which servers have the capacity to handle the service request 560 in order to meet the associated rules and preferences.

Once the service request 560 is received, the execution module 604 may route or modify execution of the service request 560. If a server is available within the multi-server system 200 that can process the service request 560 within the rules and preferences of the SLA engine 566, then the execution module 604 may route the service request 560 to the available server. If no server is available that can appropriately handle the service request 560, the proxy 550 may modify execution of the service to optimize quality of service. The server controller module 610 may control whether to shut down servers that are under-utilized upon satisfaction of a capacity threshold, or start up additional servers upon satisfaction of a capacity threshold if more processing power is required to handle service requests.

In an embodiment, the service request 560 may include or otherwise be associated with a list of preferred servers for processing the service request 560. The list of preferred servers may include a single server or multiple servers that can execute a service in response to the service request 560. When possible, the proxy 550 will route the service request 560 to one or more of these preferred servers. Further, if multiple service requests 560 are to be routed to the same server, but the server does not have the capacity to handle the service requests 560 within the latency requirements set by the SLA engine 566, then the proxy 550 can re-route at least some of the service requests 560 to other servers that can handle the requests.

To enhance quality of service in processing the service requests 560, the proxy 550 can reduce the priority of the service requests 560; discard or shut down some of the service requests 560; re-route the service requests 560 to other regions that have a lighter processing load; turn on or add additional servers to the multi-server system 200 when an overall workload increases and the quality of service requirements cannot be met; power off some servers when the workload decreases; move or re-route the service requests 560 from one server to another if the server is operating at or above capacity or a capacity threshold; etc.

In an embodiment, the proxy 550 can create a list of servers that are not preferred for handling the service requests 560. Servers on the not-preferred list may include servers that are operating at or above load capacity; servers that do not have enough processing power to handle certain of the service requests 560; servers that are under repair; servers that are returning error codes; etc. The proxy 550 may avoid routing service requests 560 to servers on the non-preferred server list. For example, if the service request 550 lists Server A as its preferred server, but Server A is on the non-preferred server list of the proxy 550 because it is already operating over capacity, then the proxy 550 may route the service request 560 to another server that can process the service request 560.

Figure 7:
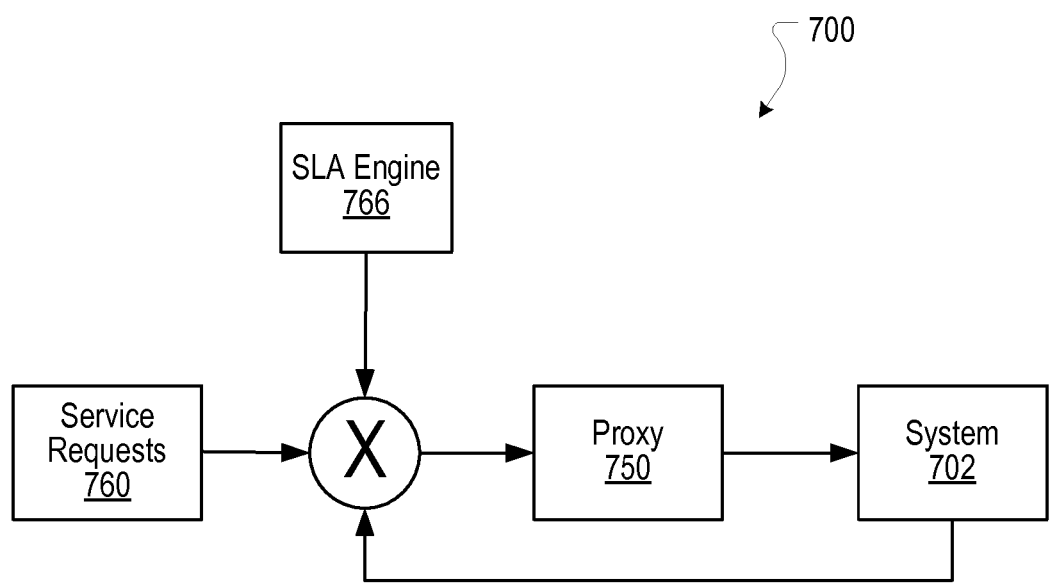
FIG. 7 is a feedback loop diagram in accordance with an embodiment of the invention.

FIG. 7 shows an adaptive capacity management system 700 as a feedback loop. Service requests 760 are created, and they are provided to a proxy 750. An SLA engine 766 provides rules and preferences associated with the service requests 760 to the proxy 750. A multi-server system 702 may include sensors (not shown) that monitor the operating parameters of servers in the system 702. The system 702 may also include a metrics aggregator (not shown) that receives and aggregates the data regarding the operating parameters. The data is provided to the proxy 750 in a feedback loop. Based on the operating parameters of the servers and the rules and preferences from the SLA engine 766, the proxy 750 may route the service requests 760 to the servers that have capacity to execute the requested services so that they can be timely completed or otherwise may modify execution of the requested services. Because the system 700 can maintain current data relating to which servers within the multi-server system 702 have and do not have the capacity to handle additional service requests, the system 700 can continuously adapt the way it handles the service requests 760 to enhance quality of service and reduce latency of the service requests 760. In an embodiment, the system 702 may be implemented by the multi-server system 200; the proxy 750 may be implemented by proxy 550; the service requests 760 may be implemented by the service requests 560; and, the SLA engine 766 may be implemented by the SLA engine 566.

Figure 8:
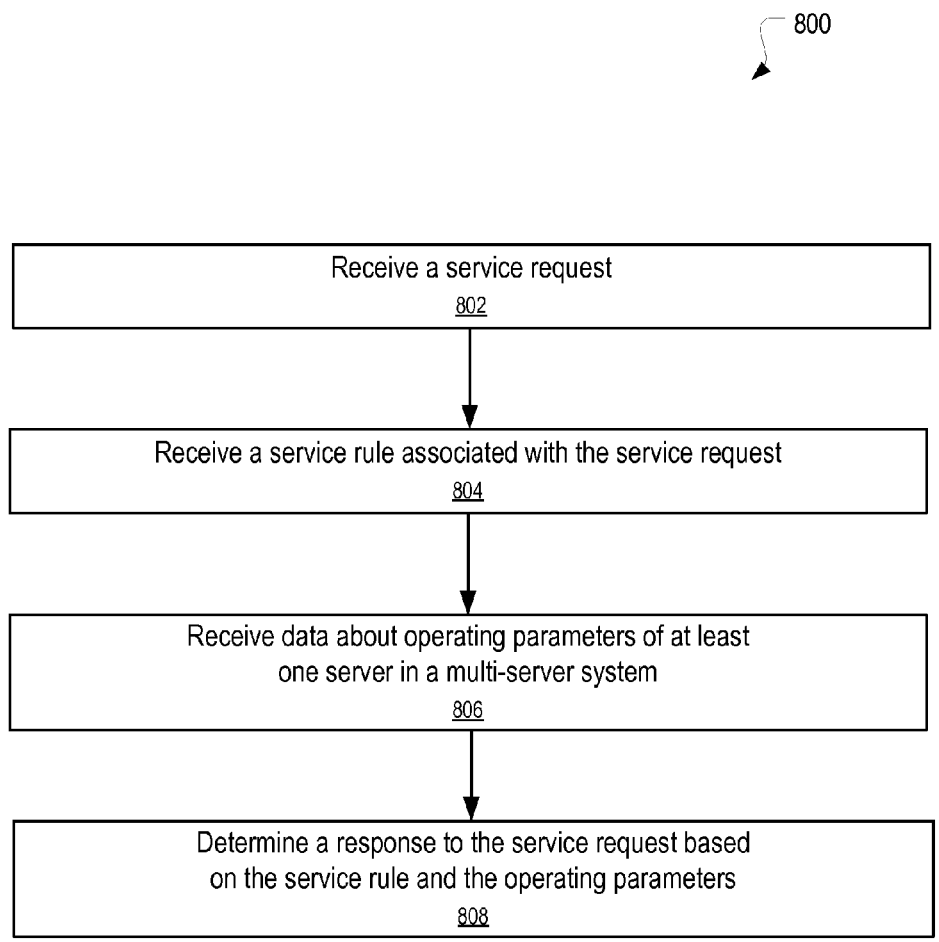
FIG. 8 shows a process for managing capacity in accordance with an embodiment of the invention.

FIG. 8 shows an example process 800 for adaptively managing capacity. In block 802, a service request is received. In block 804, a service rule associated with the service request is received. In block 806, data about operating parameters of at least one server in a multi-server system is received. In block 808, a response to the service request based on the service rule and the operating parameters is determined.

In an embodiment, a response to the service request may vary. For example, the service request may be routed to a selected server with sufficient capacity to execute the service request, a priority of the service request may be reduced, or the service request may be dropped. As another example, the service request may be routed to a geographic region having capacity to execute the service request. As yet another example, a selected server may be powered on when at least a portion of the multi-server system is operating above a capacity threshold, or a selected server may be powered off when at least a portion of the multi-server system is operating below a capacity threshold. The service request may be routed to a selected server not in a list of servers without capacity to handle the service request. In an embodiment, the process 800 may be performed in whole or in part by the adaptive capacity management module 148 or the social networking system 130.

CONCLUSION

Figure 9:
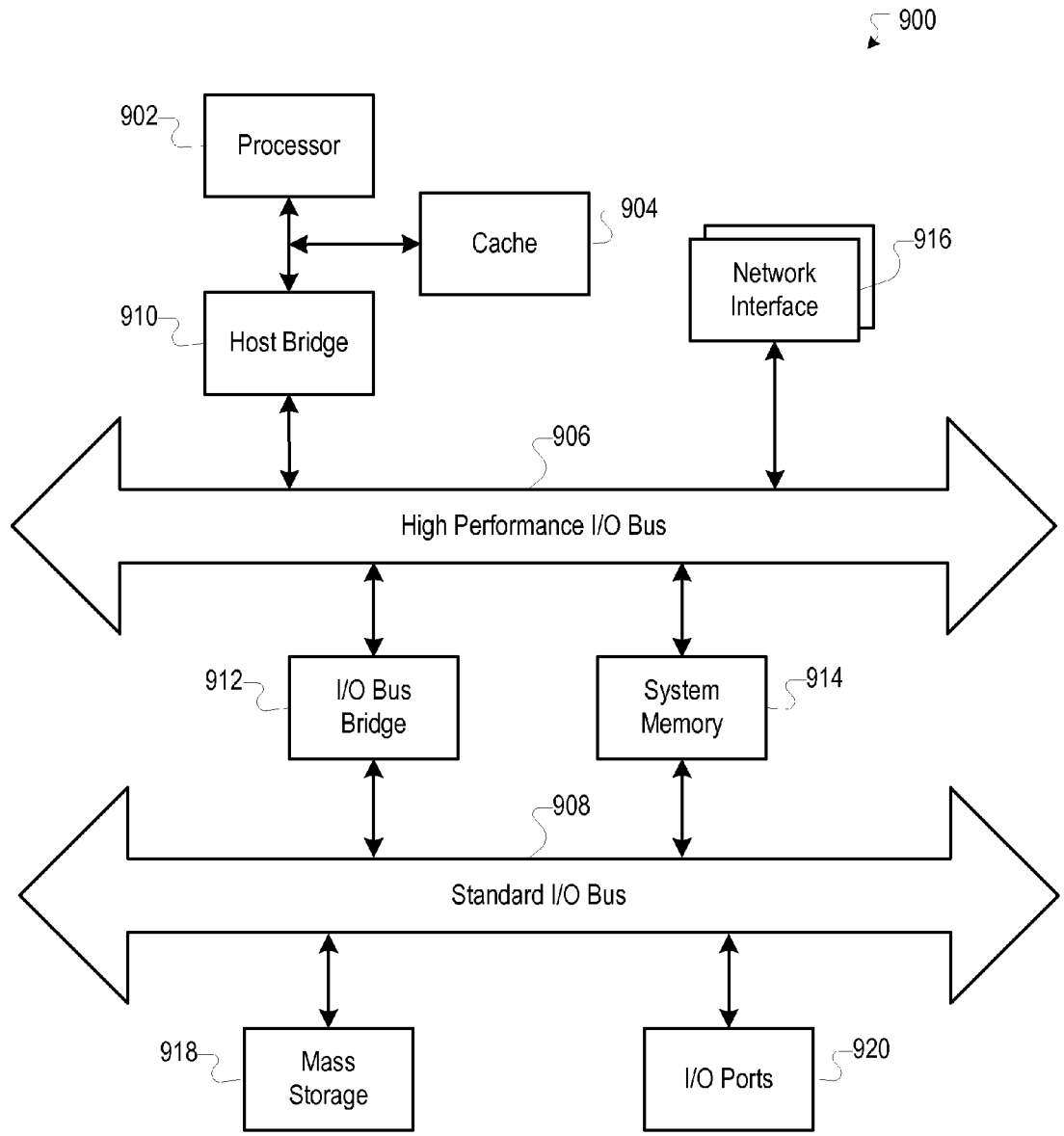
FIG. 9 shows a diagram of a computer system in accordance with an embodiment of the invention.

The foregoing processes and features can be implemented by a wide variety of machine and computer system architectures and in a wide variety of network and computing environments. FIG. 9 illustrates an example of a computer system 900 that may be used to implement one or more of the computing devices identified above. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment of the invention, the computer system 900 may be the social networking system 130, the user device 110, the external system 120, or a component thereof. In an embodiment of the invention, the computer system 900 may be one server among many that constitutes all or part of the social networking system 130.

The computer system 900 includes a processor 902, a cache memory 904, and one or more executable modules and drivers, stored on a computer-readable medium, directed to the processes and features described herein. Additionally, the computer system 900 includes a high performance input/output (I/O) bus 906 and a standard I/O bus 908. A host bridge 910 couples the processor 902 to the high performance I/O bus 906, whereas I/O bus bridge 912 couples the two buses 906 and 908 to each other. A system memory 914 and one or more network interfaces 916 couple to the bus 906. The computer system 900 may further include video memory and a display device coupled to the video memory (not shown). Mass storage 918 and I/O ports 920 couple to the bus 908. The computer system 900 may optionally include a keyboard and pointing device, a display device, or other input/output devices (not shown) coupled to the bus 908. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 900 are described in greater detail below. In particular, the network interface 916 provides communication between the computer system 900 and any of a wide range of networks, such as an Ethernet (e.g., IEEE 802.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Furthermore, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 which, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914, and then accessed and executed by processor 902.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:
    implementing an application service proxy, by a computer system, for a multi-server system to receive a service request from an application service executing within the multi-server system, wherein the service request is an inter-service communication within the multi-server system;
    receiving, by the computer system, a tiered service rule associated with the received service request;
    monitoring, by the computer system, operating parameters of at least one server in the multi-server system, wherein the operating parameters include load placed by each of one or more application services executed on each of the at least one server in the multi-server system; and
    modifying, by the computer system, execution of the service request to be performed at the at least one server based on a tier-specific threshold level of the tiered service rule that is satisfied by the monitored operating parameters, wherein modifying the execution of the service request includes narrowing service scope of the service request by omitting an action among a plurality of computer-implemented actions requested in the service request;
    determining, by the computer system, a response to the service request based on the tiered service rule and the monitored operating parameters; and
    configuring, based on the service request, the multi-server system to consume at least a server resource of the multi-server system to execute the plurality of computer-implemented actions minus the omitted action, wherein the server resource includes processor execution cycles, memory space provided by a memory device, network bandwidth provided by a network adapter, or any combination thereof.

2. The method of claim 1, wherein said monitoring the operating parameters and said determining the response are included in a feedback loop.

3. The method of claim 1, wherein the monitoring is performed continuously for a time period.

4. The method of claim 1, wherein the monitored operating parameters include at least one of:
    a number of received service requests;
    an average CPU usage;
    an average network usage;
    an average wait time for service requests;
    a type of service request received;
    a time between receipt and completion of a service request; and
    a number of database reads or writes.

5. The method of claim 1, wherein the monitoring includes tracking capacity of servers within the multi-server system.

6. The method of claim 1, wherein the service request is associated with a list of preferred servers to execute the service request.

7. The method of claim 1, further comprising routing the service request to a selected server with sufficient capacity to execute the service request.

8. The method of claim 1, wherein the service request includes priority information indicating a priority; and the method further comprising reducing the priority of the service request.

9. The method of claim 1, further comprising discarding the service request.

10. The method of claim 1, further comprising routing the service request to a selected server based on a geographic region of the selected server, wherein servers in the geographic region, according to the monitored operating parameters, have capacity to execute the service request.

11. The method of claim 1, further comprising powering on a selected server when at least a portion of the multi-server system is operating above a capacity threshold.

12. The method of claim 1, further comprising powering off a selected server when at least a portion of the multi-server system is operating below a capacity threshold.

13. The method of claim 1, further comprising routing the service request to a selected server not in a list of servers without capacity to handle the service request.

14. The method of claim 1, further comprising resolving conflict when different service requests prefer the at least one server.

15. A non-transitory computer-storage medium storing computer-executable instructions that, when executed, cause a computer system to perform a computer-implemented method, comprising:
  implementing a proxy for a multi-server system to receive a service request from a service executing within the multi-server system, wherein the service request is an inter-service communication within the multi-server system;
  receiving a tiered service rule associated with the received service request;
  monitoring data relating to operating parameters of at least one server in the multi-server system;
  modifying execution of the service request to be performed at the at least one server based on a tier-specific threshold level of the tiered service rule that is satisfied by the monitored operating parameters, wherein modifying the execution of the service request includes narrowing service scope of the service request by omitting an action among a plurality of computer-implemented actions requested in the service request; and
  determining a response to the service request based on the tiered service rule and the monitored operating parameters; and
  configuring, based on the service request, the multi-server system to consume at least a server resource of the multi-server system to execute the plurality of computer-implemented actions minus the omitted action, wherein the server resource includes processor execution cycles, memory space provided by a memory device, network bandwidth provided by a network adapter, or any combination thereof.

16. A system, comprising:
at least one processor; and
a memory storing instructions configured to instruct the at least one processor to perform:
  implementing a proxy for a multi-server system to receive a service request from a service executing within the multi-server system, wherein the service request is an inter-service communication within the multi-server system;
  receiving a tiered service rule associated with the received service request;
  monitoring data relating to operating parameters of at least one server in the multi-server system;
  modifying execution of the service request to be performed at the at least one server based on which tier-specific threshold level of the tiered service rule is satisfied by the monitored operating parameters, wherein modifying the execution of the service request includes narrowing service scope of the service request by omitting an action among a plurality of computer-implemented actions requested in the service request; and
  determining a response to the service request based on the tiered service rule and the monitored operating parameters; and
  configuring, based on the service request, the multi-server system to consume at least a server resource of the multi-server system to execute the plurality of computer-implemented actions minus the omitted action, wherein the server resource includes processor execution cycles, memory space provided by a memory device, network bandwidth provided by a network adapter, or any combination thereof.

* * * * *